No. 835,396. PATENTED NOV. 6, 1906.
A. C. CAMPBELL.
GOVERNOR.
APPLICATION FILED APR. 6, 1905. RENEWED SEPT. 14, 1906.
2 SHEETS—SHEET 2.
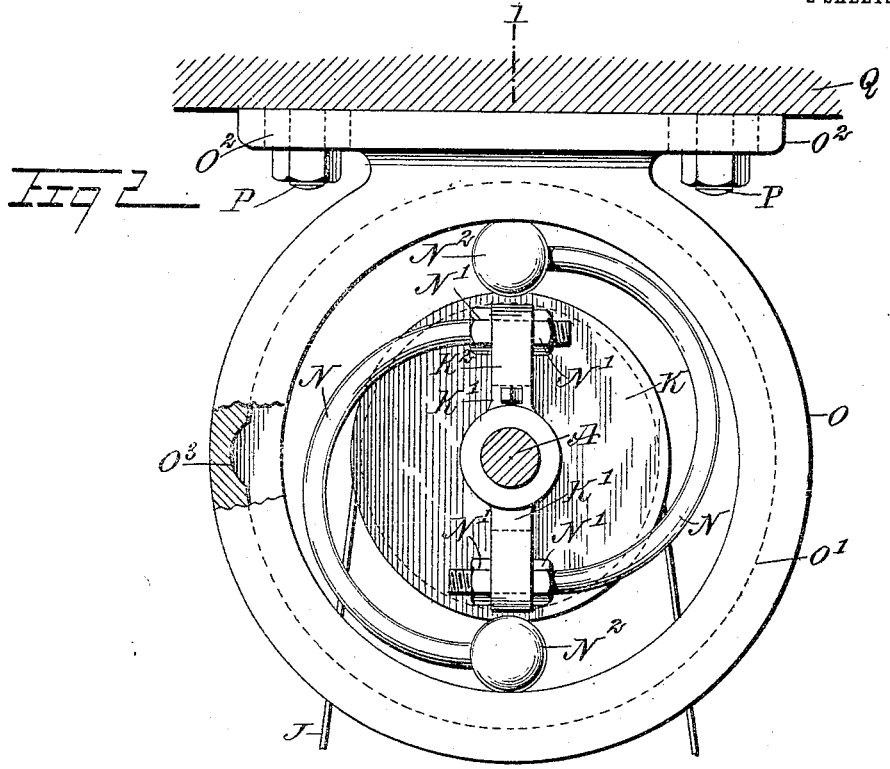
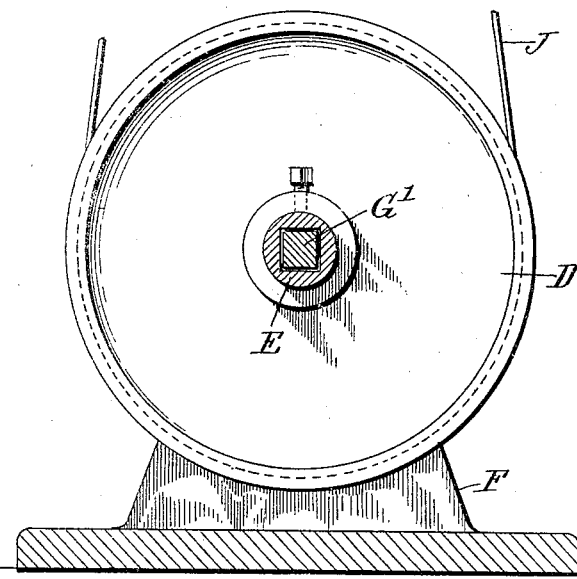
WITNESSES:
INVENTOR
Alonzo C. Campbell
BY
ATTORNEYS

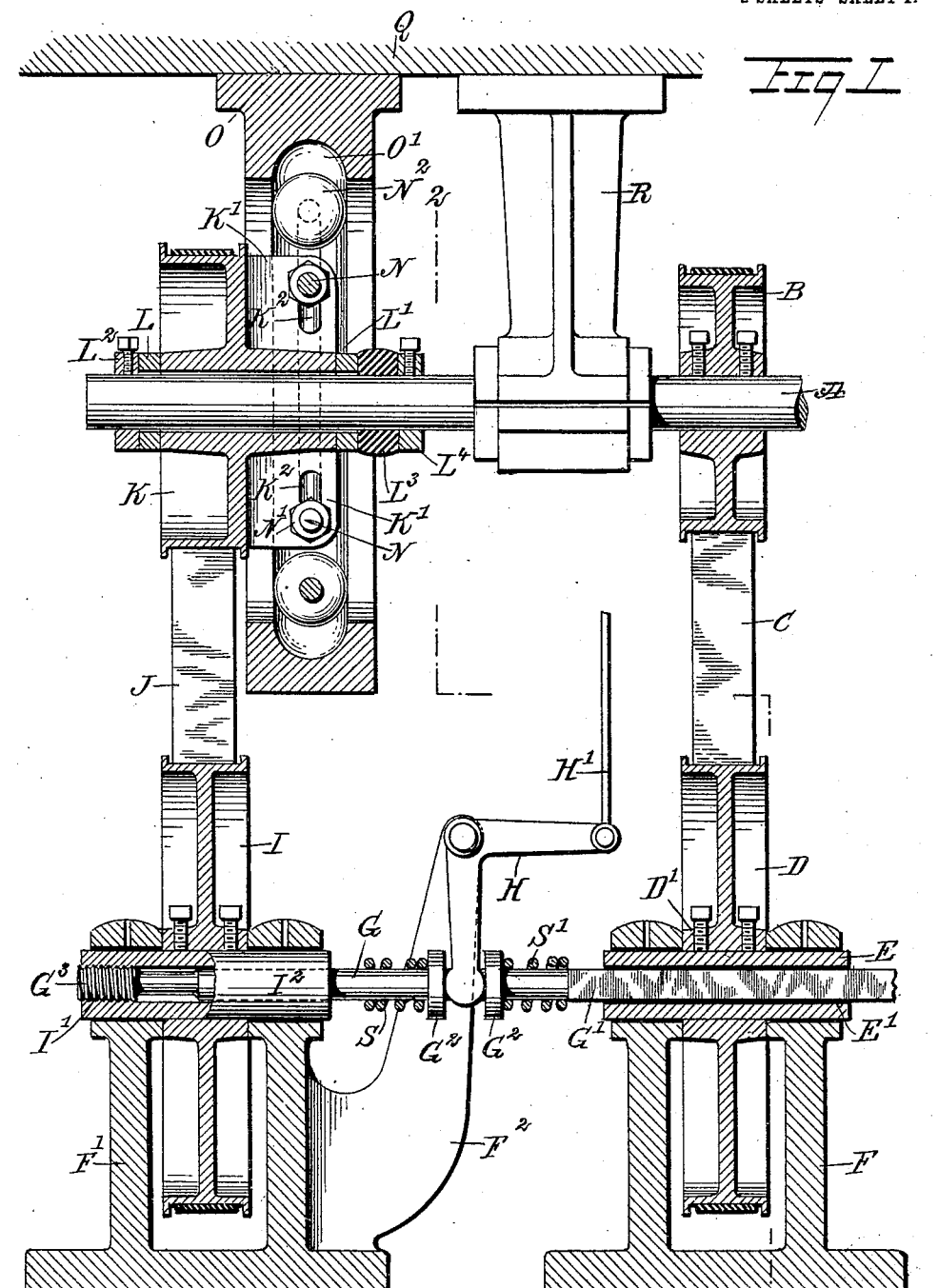

UNITED STATES PATENT OFFICE.

ALONZO C. CAMPBELL, OF ASHEVILLE, NORTH CAROLINA.

GOVERNOR.

No. 835,396.     Specification of Letters Patent.     Patented Nov. 6, 1906.

Application filed April 6, 1905. Renewed September 14, 1906. Serial No. 334,597.

*To all whom it may concern:*

Be it known that I, ALONZO C. CAMPBELL, a citizen of the United States, and a resident of Asheville, in the county of Buncombe and State of North Carolina, have invented a new and Improved Governor, of which the following is a full, clear, and exact description.

The invention relates to devices for regulating the speed of engines, motors, and other machinery; and its object is to provide a new and improved governor, more especially designed to subject the source of power to such automatic restraint as to check any tendency to variability of the speed of the motor, the governor being simple and durable in construction, exceedingly sensitive, and positive in its action, and not liable to easily get out of order.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a sectional side elevation of the improvement on the line 1 1 of Fig. 2, and Fig. 2 is a transverse section of the same on the line 2 2 of Fig. 1.

The shaft A rotates in unison with the main shaft of the engine, motor, or other machine to be governed, and on this driven shaft A is secured a driving-pulley B, connected by a belt C with another driving-pulley D, having a bushing E journaled in suitable bearings carried on a standard F, preferably made in the manner shown in Fig. 1, so that the hub D' of the pulley fits between the bearings to hold the pulley against longitudinal movement. The bushing E is provided with a polygonal opening E', into which fits the correspondingly-shaped polygonal portion G' of a spindle G, provided with spaced collars $G^2$, between which extends one arm of a bell-crank lever H, connected by a link H' with the controlling mechanism for the motive agent of the engine, motor, or other machine to be governed. Thus for a steam-engine the link H' is connected with a throttle-valve, and for an electric motor the link H' is connected with a switch or rheostat, &c.

The spindle G is provided with a threaded portion $G^3$, screwing in a nut I', forming an integral part of the bushing $I^2$ of a spindle-pulley I, so that the spindle G has a bearing in the two bushings E and $I^2$, as will be readily understood by reference to Fig. 1. The bushing $I^2$ is journaled in a suitable standard F', provided with a bracket $F^2$, on which the bell-crank lever H is fulcrumed.

The spindle-pulley I is rotated at a uniform rate of speed, and for this purpose suitable devices may be provided, preferably, however, the device shown in the drawings, which device is driven from the driven shaft A. For the purpose described the spindle-pulley I is connected by a belt J with a governor-pulley K, mounted to rotate loosely on the driven shaft A, and the ends of the hub of the pulley K engage metallic washers L and L', of which the washer L rests against a collar $L^2$, secured to the shaft A, and the other washer L' is pressed on by a rubber cushion $L^3$, abutting against a collar $L^4$, likewise secured to the main shaft A. Thus by the arrangement described the pulley K is connected by the friction device shown and just described to the main shaft A, so as to rotate with the same.

On the governor-pulley K are secured radial arms or wings K', having elongated slots $K^2$, engaged by spring-arms N, fastened in place on the wings K' by nuts N', and on the free ends of the said arms are secured centrifugal weights $N^2$, adapted to swing into contact with the wall of an annular groove O', formed in a bearing O, adjustably secured by bolts P to a suitable support Q, which also carries a bearing R for the driven shaft A. The bolts P extend through elongated slots $O^2$, formed in the bearing O, to allow shifting the latter to bring the annular groove O' eccentric relative to the axis of the shaft A, and the said annular groove O' is provided in its wall with a pocket $O^3$, conforming to the shape of the centrifugal weights $N^2$, so as to retard the same in their travel through the groove O' whenever deemed necessary. Normally the centrifugal weights $N^2$ are out of engagement with the wall of the groove O'; but when the pulley K is rotated from the driven shaft A then the said weights swing outward by centrifugal force and in engagement with the wall of the groove O', so that the speed of the pulley K is reduced relative to the speed of the driven shaft A. In other words, the pulley K is rotated at a uniform rate of speed from the driven shaft A the moment the latter exceeds a normal rate of speed. The rotary motion of the governor-pulley K is transmitted by the belt J to the spindle-pulley I, whereby the latter is rotated at a uniform rate of speed irrespective of the speed of the driven shaft A. As shown in the drawings, the pulley K is somewhat larger than the pulley B, while the pulleys D and I are alike in size to provide a reserve of speed in the event the shaft A moves slower than the normal speed, as the peripheral speed of the pulley K will be sufficient to maintain the normal rate of speed of the spindle-pulley I.

The operation is as follows: When the pulleys D and I rotate at the same rate of speed, then the spindle G rotates with the said pulleys and stands in the position shown in Fig. 1, so that the controller for the motive agent of the machine to be governed is in a normal open position; but when the pulley D rotates faster than the pulley I then the spindle G rotates with the pulley D, and the threaded portion $G^3$, screwing in the nut I', causes the spindle G to travel from the right to the left, whereby the bell-crank lever H is caused to swing, and consequently the controller for the motive agent is actuated with a view to throttle the same until the speed of the motor, and consequently that of the shaft A and pulley D, returns to a normal speed. In case the pulley D travels slower than the pulley I, then the spindle G for the same reason travels from the left to the right to actuate the bell-crank lever H with a view to admitting more motive agent to the engine, motor, or the like with a view to increase the speed thereof. It is understood that as the spindle-pulley I rotates at the uniform rate of speed it is evident that any variation of this speed in the pulley D causes a traveling of the spindle G in the corresponding direction, as above described, and the controller for the motive agent of the engine, motor, or other machine is correspondingly governed.

On the spindle G, adjacent to the collars $G^2$, are arranged springs S and S', of which the spring S is adapted to be compressed when the spindle G moves from the right to the left by abutting against the adjacent end of the bushing $I^2$, and the spring S' is adapted to be compressed by the spindle G moving from the left to the right and on the spring abutting against the bushing E.

If for any unforseen reason or from an accident the threaded portion $G^3$ of the spindle G should travel to the limit in either direction and disengage the nut I', then the spring S or S', on account of being compressed, keeps the threaded portion $G^3$ against the end of the nut I' to cause the threaded portion $G^3$ to screw into the nut I' as soon as normal conditions are restored. By this arrangement a safeguard is provided against the self-destruction of the part, and at the same time a runaway condition of the engine or excessive speed thereof is prevented.

In order to insure against overspeed, the bearing O may be adjusted to bring its groove O' eccentric to the axis of the shaft A—that is, the pocket $O^3$ is moved farther from the shaft A. By this arrangement the centrifugal weights $N^2$ are brought nearer to the wall of the groove O' at the side opposite the pocket $O^3$, so that they bear against the wall of the groove at that side; but they touch the opposite side. As the speed of the shaft A increases, the centrifugal weights $N^2$ reach out more and more until they finally drop at each revolution into the pocket $O^3$, thus acting as a more positive arrest of the motion until the speed of the shaft A is reduced to a normal condition.

From the foregoing it will be seen that by the arrangement described the source of power for the motor, engine, or other machine to be governed is restrained to such an extent as to check any tendency to variability of speed of the motor, engine, or the like.

Having thus described my invention, I claim as new and desire to secure by Letters Patent—

1. A governor comprising a revoluble body driven at a uniform rate of speed, and a device driven in unison with the machine to be governed and connected with the controller for the motive agent of the said machine, the said device having threaded connection with the said body, for the latter to actuate the device on a difference in the speed of the said body and the said device, and embodying a spindle and a nut.

2. A governor provided with a revoluble body driven at a uniform rate of speed, a spindle driven in unison with the speed of the motor to be governed and connected with the controller for the motive agent, and means for connecting the said spindle with the said revoluble body, to shift the spindle on a variation of speed between the spindle and the said body, embodying a screw-thread on the spindle and a nut.

3. A governor comprising a revoluble body driven at a uniform rate of speed, a device driven in unison with the machine to be governed and connected with the controller for the motive agent of the said machine, the said device having connection with the said body, for the latter to actuate the device on a difference in the speed of the said body and the said device, and means for driving the said body at a uniform rate of speed from the machine to be governed, said connection embodying a thread on the device and a nut.

4. A governor comprising a revoluble body driven at a uniform rate of speed, a spindle connected with the controller for the motive agent of the machine to be governed, the said spindle having a screw-thread screwing in the said body, and means for rotating the said spindle in unison with the machine to be governed, embodying a nut.

5. A governor comprising a revoluble body driven at a uniform rate of speed, a spindle connected with the controller for the motive agent of the machine to be governed, the said spindle having a screw-thread and the said spindle having a polygonal portion, a pulley driven from the machine to be governed and having its hub fitting the polygonal portion of the said spindle, and a pulley and a nut associated with the spindle, said screw-thread being received in said nut.

6. A governor comprising a revoluble body driven at a uniform rate of speed, a spindle connected with the controller for the motive agent of the machine to be governed, the said spindle having a screw-thread, means for rotating the said spindle in unison with the machine to be governed, a driving device for rotating the said body, controlled from the machine to be governed, and a nut associated with the body, in which said screw-thread is received.

7. A governor comprising a revoluble body driven at a uniform rate of speed, a spindle connected with the controller for the motive agent of the machine to be governed, the said spindle having a screw-thread screwing in the said body, means for rotating the said spindle in unison with the machine to be governed, and a driving device for rotating the said body and consisting of a fixed member, a revoluble member connected with the said body for driving the latter, centrifugal weights on the said revoluble member, adapted to engage the said fixed member, a shaft driven from the machine to be governed and a friction device connecting the said shaft with the said revoluble member.

8. A governor comprising a revoluble body driven at a uniform rate of speed, a spindle connected with the controller for the motive agent of the machine to be governed, the said spindle having a screw-thread screwing in the said body, means for rotating the said spindle in unison with the machine to be governed, and springs for moving the spindle in threading engagement with the said body.

9. A governor comprising a revoluble body driven at a uniform rate of speed, a spindle connected with the controller for the motive agent of the machine to be governed, the said spindle having a screw-thread screwing in the said body and the said spindle having a polygonal portion, a pulley driven from the machine to be governed and having its hub fitting the polygonal portion of the said spindle, and springs on the said spindle, adapted to be compressed on coming in contact with the said body or the said pulley.

10. A governor comprising a shaft driven from the machine to be governed, a spindle mounted to slide and connected with the controller for the motive agent of the said machine, driving pulleys and belts connecting the said shaft with the said spindle, and a spindle-pulley having a uniform rotary motion and provided with a nut in which screws a threaded portion of the said spindle.

11. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, and springs on the spindle, adapted to be compressed previous to the said threaded portion unscrewing from the nut in either direction.

12. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, and a centrifugal driving device for the said pulley, driven from the said shaft.

13. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, a governor-pulley loose on the said shaft, a belt connecting said governor-pulley with the said spindle-pulley, a friction device connecting the said governor-pulley with the said shaft, centrifugal weights on the said governor-pulley, and a bearing adapted to be engaged by the said weights.

14. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, a governor-pulley loose on the said shaft, a belt connecting said governor-pulley with the said spindle-pulley, a friction device connecting the said governor-pulley with the said shaft, centrifugal weights on the said governor-pulley, and a bearing having an annular groove for engagement by the said weights.

15. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, a governor-pulley loose on the said shaft, a belt connecting said governor-pulley with the said spindle-pulley, a friction device connecting the said governor-pulley with the said shaft, centrifugal weights on the said governor-pulley, and a bearing having an annular groove for engagement by the said weights, the said bearing being adjustable to bring the groove eccentric relative to the said shaft.

16. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, a governor-pulley loose on the said shaft, a belt connecting said governor-pulley with the said spindle-pulley, a friction device connecting the said governor-pulley with the said shaft, centrifugal weights on the said governor-pulley, and a bearing having an annular groove for engagement by the said weights, the said bearing being adjustable to bring the groove eccentric relative to the said shaft, and the said groove having a pocket for engagement by the said centrifugal weights.

17. A governor provided with a driven shaft, a pulley loose on the said shaft, a friction device connecting the said shaft with the said pulley, centrifugal weights on the said pulley, and a fixed bearing having an annular groove adapted to be engaged by the said centrifugal weights.

18. A governor comprising a shaft driven from the machine to be governed, a spindle mounted to slide and connected with the controller for the motive agent of the said machine, driving pulleys and belts connecting the said shaft with the said spindle, a spindle-pulley having a uniform rotary motion and provided with a nut in which screws a threaded portion of the said spindle, a governor-pulley loose on the said shaft, a belt connecting said governor-pulley with the said spindle-pulley, a friction device connecting the said governor-pulley with the said shaft, centrifugal weights on the said governor-pulley, and a bearing adapted to be engaged by the said weights, the driving-pulley on the said shaft being of less diameter than the said governor-pulley.

In testimony whereof I have signed my name to this specification in the presence of two subscribing witnesses.

ALONZO C. CAMPBELL.

Witnesses:
   EDWIN L. BROWN, Jr.,
   C. E. PILSON.